(12) United States Patent
Panelli

(10) Patent No.: US 9,511,442 B2
(45) Date of Patent: Dec. 6, 2016

(54) ADAPTABLE ROTATING ARC WELDING METHOD AND SYSTEM

(71) Applicant: Illinois Tool Works Inc., Glenview, IL (US)

(72) Inventor: Edward J. Panelli, Wauwatosa, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 530 days.

(21) Appl. No.: 13/767,392

(22) Filed: Feb. 14, 2013

(65) Prior Publication Data

US 2014/0027422 A1 Jan. 30, 2014

Related U.S. Application Data

(60) Provisional application No. 61/676,563, filed on Jul. 27, 2012.

(51) Int. Cl.
| | |
|---|---|
| *B23K 9/095* | (2006.01) |
| *B23K 9/02* | (2006.01) |
| *B23K 9/173* | (2006.01) |
| *B23K 31/00* | (2006.01) |

(52) U.S. Cl.
CPC ............ *B23K 9/095* (2013.01); *B23K 9/0216* (2013.01); *B23K 9/0956* (2013.01); *B23K 9/173* (2013.01); *B23K 31/003* (2013.01)

(58) Field of Classification Search
CPC .. B23K 31/003; B23K 9/0216; B23K 9/095; B23K 9/0956; B23K 9/173
See application file for complete search history.

(56) References Cited

U.S. PATENT DOCUMENTS

| | | | |
|---|---|---|---|
| 3,818,176 A | | 6/1974 | Brown |
| 4,356,378 A | * | 10/1982 | Cloos et al. ............... 219/124.1 |
| 4,441,011 A | * | 4/1984 | Nomura et al. ......... 219/124.34 |
| 4,621,185 A | * | 11/1986 | Brown .................... 219/124.34 |
| 4,704,513 A | | 11/1987 | Sugitani |
| 4,717,807 A | | 1/1988 | Parks |
| 4,835,360 A | | 5/1989 | Parks |
| 4,897,523 A | | 1/1990 | Parks |
| 4,954,691 A | | 9/1990 | Parks |

(Continued)

FOREIGN PATENT DOCUMENTS

| | | |
|---|---|---|
| CN | 1212215 | 7/2005 |
| DE | 4315780 | 11/1994 |

(Continued)

OTHER PUBLICATIONS

Machine translation of Japan Patent document No. 9-094,658, Nov. 2015.*

(Continued)

*Primary Examiner* — Geoffrey S Evans
(74) *Attorney, Agent, or Firm* — Fletcher Yoder P.C.

(57) ABSTRACT

A welding operation is performed utilizing a rotating arc resulting from movement of a welding electrode in a welding torch. Workpiece fit-up is determined as the weld progresses, such as via a camera and image analysis. In the event that fit-up changes, such as by the development of gaps between the workpieces, one or more parameters of the system may be altered, such as the geometry of the electrode movement, the travel speed, the wire feed speed, the weld power applied to the electrode, and so forth. The technique may be automated, such as for accommodating welding via welding robots.

20 Claims, 4 Drawing Sheets

(56) References Cited

U.S. PATENT DOCUMENTS

| | | |
|---|---|---|
| 4,999,478 A | 3/1991 | Bushey |
| 5,030,812 A | 7/1991 | Sugitani |
| 5,040,125 A * | 8/1991 | Okumura et al. ....... 219/124.34 |
| 5,864,115 A | 1/1999 | Ikeda |
| 5,938,955 A * | 8/1999 | Ikeda .................... B23K 9/022 |
| | | 219/124.34 |
| 5,961,863 A | 10/1999 | Stava |
| 5,981,906 A | 11/1999 | Parker |
| 6,002,104 A | 12/1999 | Hsu |
| 6,051,810 A | 4/2000 | Stava |
| 6,093,906 A | 7/2000 | Nicholson |
| 6,172,333 B1 | 1/2001 | Stava |
| 6,204,478 B1 | 3/2001 | Nicholson |
| 6,215,100 B1 | 4/2001 | Stava |
| 6,267,291 B1 | 7/2001 | Blankenship |
| 6,441,342 B1 | 8/2002 | Hsu |
| 6,501,049 B2 | 12/2002 | Stava |
| 6,510,984 B2 | 1/2003 | Blankenship |
| 6,536,660 B2 | 3/2003 | Blankenship |
| 6,708,877 B2 | 3/2004 | Blankenship |
| 6,723,954 B2 | 4/2004 | Nikodym |
| 6,730,875 B2 | 5/2004 | Hsu |
| 6,909,066 B2 * | 6/2005 | Zheng et al. ............ 219/124.34 |
| 6,942,139 B2 | 9/2005 | Lipnevicius |
| 7,032,814 B2 | 4/2006 | Blankenship |
| 7,067,767 B2 | 6/2006 | Hsu |
| 7,087,860 B2 | 8/2006 | Nikodym |
| 7,109,439 B2 | 9/2006 | Stava |
| 7,304,269 B2 | 12/2007 | Fulmer |
| 7,397,015 B2 | 7/2008 | Peters |
| 7,683,290 B2 | 3/2010 | Daniel |
| 7,863,538 B2 | 1/2011 | Barhorst |
| 8,203,099 B2 | 6/2012 | Peters |
| 8,283,598 B2 | 10/2012 | Fulmer |
| 8,373,093 B2 | 2/2013 | Peters |
| 8,410,398 B2 | 4/2013 | Daniel |
| 8,445,816 B2 | 5/2013 | Cole |
| 2003/0116548 A1 | 6/2003 | Blankenship |
| 2004/0026396 A1 | 2/2004 | Nikodym |
| 2005/0103766 A1* | 5/2005 | Iizuka et al. ............ 219/124.34 |
| 2005/0224480 A1 | 10/2005 | Lipnevicius |
| 2008/0041834 A1* | 2/2008 | Nishimura ........... B23K 9/0671 |
| | | 219/125.1 |
| 2008/0053978 A1 | 3/2008 | Peters |
| 2008/0245774 A1 | 10/2008 | Kim |
| 2009/0045172 A1 | 2/2009 | VanErk |
| 2009/0321402 A1 | 12/2009 | Doyle |
| 2010/0176104 A1 | 7/2010 | Peters |
| 2010/0301029 A1* | 12/2010 | Meckler ................. B23K 9/095 |
| | | 219/130.1 |
| 2011/0155710 A1 | 6/2011 | Farah |
| 2011/0297658 A1 | 12/2011 | Peters |
| 2012/0061364 A1 | 3/2012 | Purslow |
| 2012/0097655 A1 | 4/2012 | Daniel |
| 2012/0097656 A1 | 4/2012 | Peters |
| 2012/0152920 A1 | 6/2012 | Enyedy |
| 2012/0152921 A1 | 6/2012 | Peters |
| 2013/0001210 A1 | 1/2013 | Pagano |
| 2013/0015170 A1 | 1/2013 | Peters |
| 2013/0043219 A1 | 2/2013 | Peters et al. |
| 2013/0092667 A1 | 4/2013 | Peters |
| 2013/0112675 A1 | 5/2013 | Peters |
| 2013/0175247 A1 | 7/2013 | Peters |
| 2013/0193124 A1 | 8/2013 | Peters |
| 2013/0213948 A1 | 8/2013 | Peters |
| 2013/0228555 A1 | 9/2013 | Peters |
| 2013/0264323 A1 | 10/2013 | Daniel |
| 2015/0076119 A1 | 3/2015 | Hsu |
| 2015/0076120 A1 | 3/2015 | Pagano |

FOREIGN PATENT DOCUMENTS

| | | | |
|---|---|---|---|
| EP | 0076498 | | 4/1983 |
| EP | 0278620 | | 8/1988 |
| EP | 0402648 | | 12/1990 |
| EP | 0824985 | | 2/1998 |
| EP | 1710043 | | 10/2006 |
| EP | 1733838 | | 12/2006 |
| JP | S58107271 | | 6/1983 |
| JP | S59101280 | | 6/1984 |
| JP | S644875 | | 1/1989 |
| JP | 1-071580 A | * | 3/1989 |
| JP | 01-91965 A | * | 4/1989 |
| JP | 01-91966 A | * | 4/1989 |
| JP | 3018474 | | 1/1991 |
| JP | 4187380 | | 7/1992 |
| JP | 4200866 | | 7/1992 |
| JP | 5-023856 A | * | 2/1993 |
| JP | 0523856 | | 2/1993 |
| JP | H05309476 | | 11/1993 |
| JP | 6-122074 A | * | 5/1994 |
| JP | 0866771 | | 3/1996 |
| JP | H0866771 | | 3/1996 |
| JP | 9-094658 A | * | 4/1997 |
| JP | 9094658 | | 4/1997 |
| JP | H0994658 | | 4/1997 |
| JP | H09300072 | | 11/1997 |
| JP | 106004 | | 1/1998 |
| JP | H106004 | | 1/1998 |
| JP | 10052754 | | 2/1998 |
| JP | H11239878 | | 9/1999 |
| JP | 2000301332 | | 10/2000 |
| JP | 2001-259838 A | * | 9/2001 |
| JP | 2002-239733 A | * | 8/2002 |
| JP | 2002-316264 A | * | 10/2002 |
| JP | 2010253533 | | 11/2010 |
| SU | 1106619 A | * | 8/1984 |
| SU | 1593831 A1 | * | 9/1990 |
| WO | 2012076750 | | 6/2012 |
| WO | 2013045214 | | 4/2013 |

OTHER PUBLICATIONS

Machine translation of Japan Patent Document No. 6-122,074, Jul. 2016.*

Steve Barhorst: "Metal cored electrode basics", The American Welder, Dec. 31, 2000, p. 1, XP002685315, American Welding Society Retrieved from the Internet: URL:http://www.aws.org/wj/amwelder/11-00/barhorst.html [retrieved on Oct. 16, 2012].

International Search Report from PCT application No. PCT/US2012/044466 dated Nov. 5, 2012, 11 pgs.

Iwata, Shinji, Murayama, Masatoshi, and Kojima, Yuji; "Application of Narrow Gap Welding Process with High Speed Rotating Arc to Box Column Joints of Heavy Thick Plates," JFE Technical Report, No. 14, Dec. 2009, pp. 16-21.

Sugitani, Y, Kobayashi, Y, and Murayama, M, "Development and application of automatic high speed rotation and arc welding," Welding International, 5 (7), pp. 577-583, 1991.

International Search Report from PCT application No. PCT/US2012/069378 dated Apr. 2, 2013, 15 pgs.

International Search Report from PCT application No. PCT/US2014/055090, dated, Dec. 18, 2014, 9 pgs.

International Search Report from PCT application No. PCT/US2013/052356 dated Dec. 2, 2013, 15 pgs.

International Search Report from PCT application No. PCT/US2014/055094, dated Apr. 30, 2015, 14 pgs.

* cited by examiner

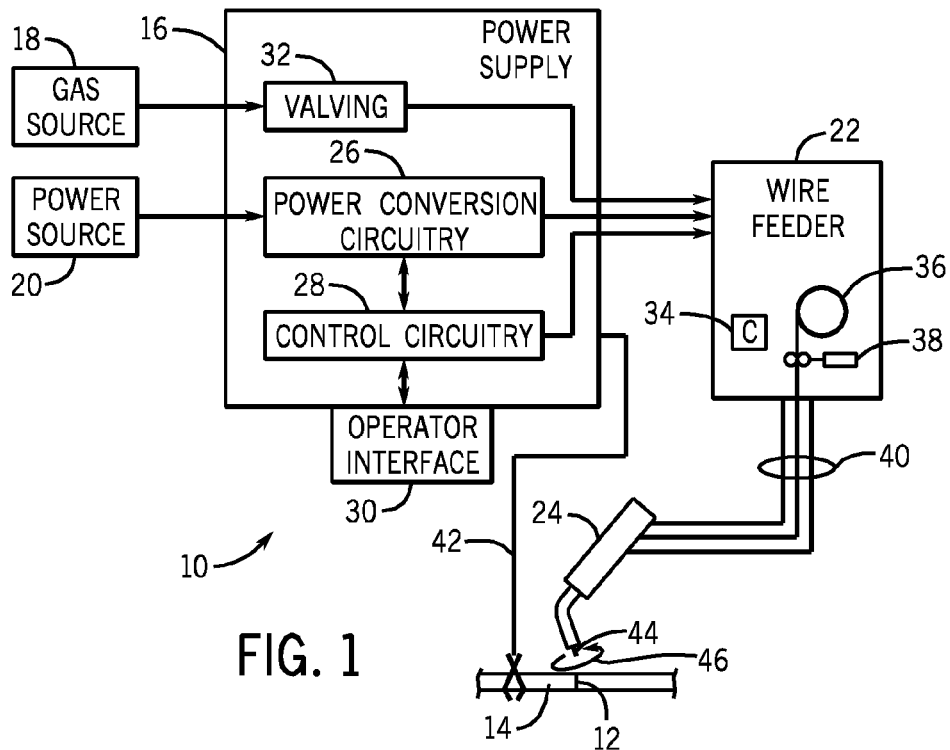
FIG. 1
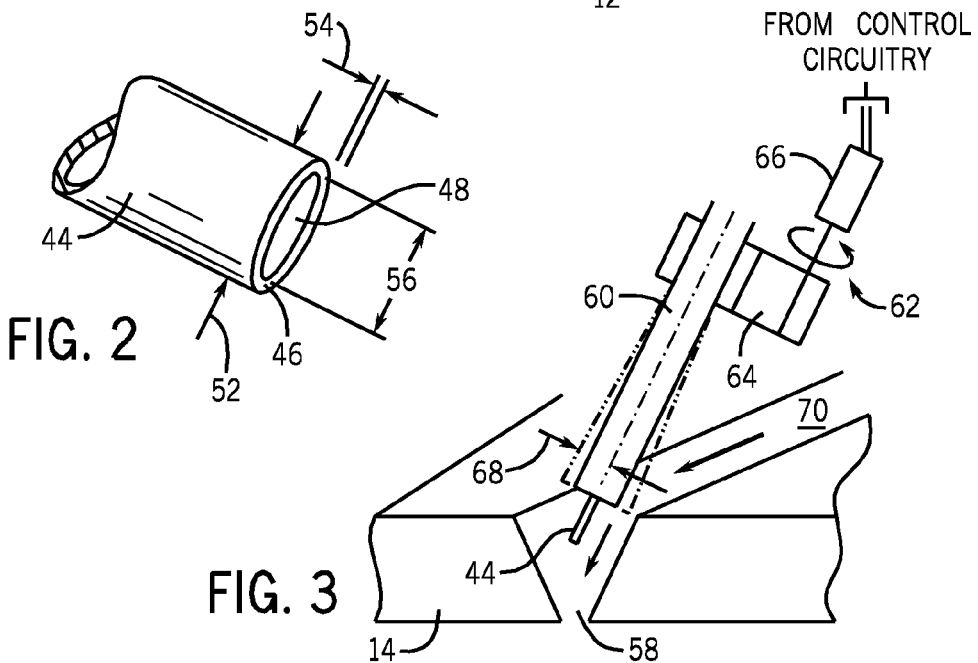
FIG. 2
FIG. 3

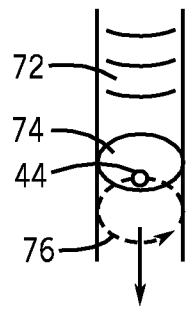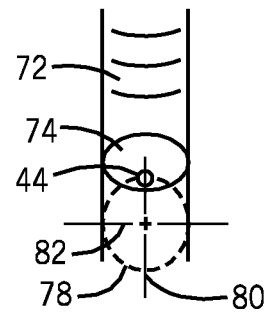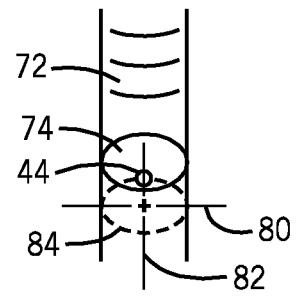
FIG. 4   FIG. 5   FIG. 6
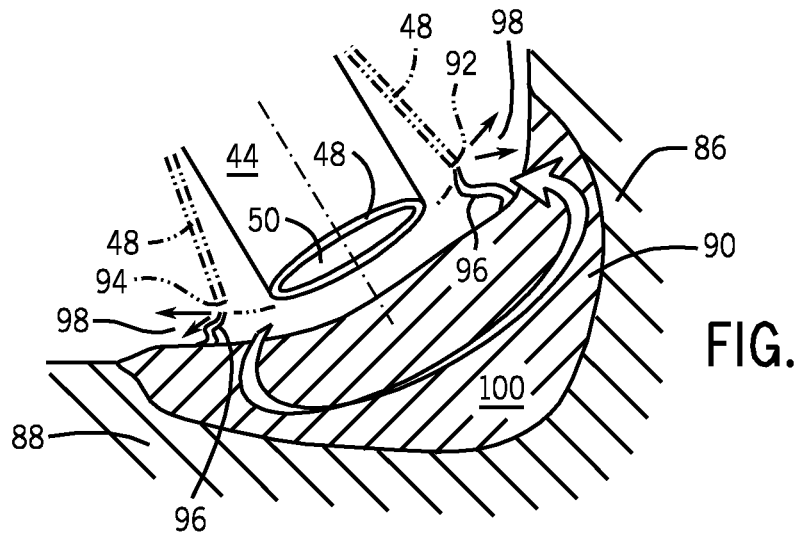
FIG. 7
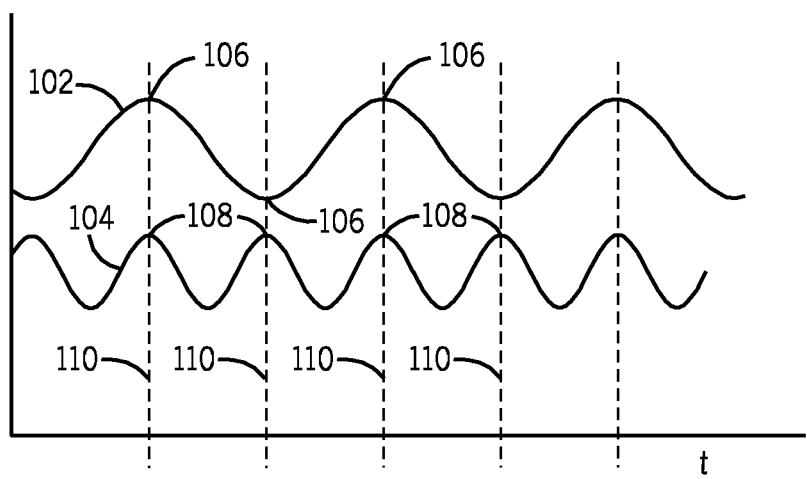
FIG. 8

ADAPTABLE ROTATING ARC WELDING METHOD AND SYSTEM

CROSS REFERENCE TO RELATED APPLICATIONS

This application is a Non-provisional U.S. Patent Application of U.S. Provisional Patent Application No. 61/676,563, entitled "Adaptable Rotating Arc Welding Method and System," filed Jul. 27, 2012, which is herein incorporated by reference.

BACKGROUND

The invention relates generally to welding techniques, and more particularly to improved processes of detecting and adjusting for poor fit-up between workpieces in such a way that enhances performance, reduces waste, and may reduce rejection of finished parts. The present disclosure is related to previously filed U.S. patent application Ser. No. 13/526,278, entitled "Metal Cored Welding Method and System," filed on Jun. 18, 2012, which is hereby incorporated into the present disclosure by reference. The present disclosure also incorporates U.S. patent application Ser. No. 13/681,687, entitled "DC Electrode Negative Rotating Arc Welding Method and System," filed on Nov. 20, 2012.

A range of techniques have been developed for joining workpieces by welding operations. These include diverse processes and materials, with most modern processes involving arcs developed between a consumable or non-consumable electrode and the workpieces. The processes are often grouped in such categories as constant current processes, constant voltage processes, pulsed processes, and so forth. However, further divisions between these are common, particularly in processes that consume an electrode to add filler metal to the weld. In virtually all such cases, the process selected is highly linked to the filler material and its form, with certain processes exclusively utilizing a particular type of electrode. For example, certain types of metal inert gas (MIG) welding processes, which form part of a larger group sometimes referred to as gas metal arc welding (GMAW).

In GMAW welding, an electrode in the form of a wire is consumed by the progressing weld pool, melted by the heat of an arc between the electrode wire and the workpiece. The wire is continuously fed from a spool through welding gun where a charge is imparted to the wire to create the arc. The electrode configurations used in these processes are often referred to as either solid wire, flux cored or metal cored. Each type is considered to have distinct advantages and disadvantages over the others, and careful adjustments to the welding process and weld settings may be required to optimize their performance. For example, solid wire, while less expensive than the other types, is typically used with inert shielding gases, which can be relatively expensive. Flux cored wires may not require separate shielding gas feeds, but are more expensive than solid wires. Metal cored wires do require shielding gas, but these may be adjusted to mixes that are sometimes less expensive than those required for solid wires.

All three of these electrode types may be used with different transfer modes, referring to the mechanical and electromechanical phenomena of moving metal from the electrode tip to the progressing weld bead. A number of such transfer modes exist, such as short circuit transfer, globular transfer, spray transfer, and pulsed spray transfer. In practice, transfer physics may appear as a hybrid of these, and the actual material transfer may transition between them during welding, although the process and electrode are often selected to maintain a certain transfer mode.

As the torch progresses and consumes the wire it leaves behind a deposit of filler material between the two workpieces known as a weld bead. In general the width of the weld bead created during the transfer mode is seen as a function of several operative parameters. Depending on the fit-up between the work pieces, the weld bead width may or may not be adequate to ensure the integrity of the finished welded product. To avoid this, a welding operator must visually detect the fit-up for any workpiece gaps prior to welding and compensate manually to ensure the integrity of the welded piece. However, automated welding systems lack this intelligent consideration and simply complete welds along a predetermined path in spite of fit-up errors and gaps that may be present. This may result in weld defects, manual reworking, and ultimate rejection of finished welded parts.

Manufacturers are constantly looking for new ways to improve automated welding methods, increase the success rate of the welded pieces, and speed up the manufacturing process overall. However, current automated welding techniques coupled with the increased speed of the processes that manufacturers have come to rely on can result in many finished workpieces with poor fit-up.

BRIEF DESCRIPTION

The present disclosure summarizes a new technique of automatically detecting a fit-up parameter, such as workpiece gaps in real time during the welding process and accounting for the fit-up parameter by altering the width of the weld bead between the workpieces. This is accomplished utilizing a spinning arc or electrode and by automatically adjusting weld parameters such as the spin geometry of the electrode, travel speed of the welding torch, wire feed speed of the electrode, weld power applied to the electrode or one of several other parameters. The processes involved rely on a camera/laser detection device that detects gaps, or more generally, fit-up along the welding torch path between the workpieces so that the weld bead width can then be changed to accommodate the fit-up, and the appropriate amount of material added at the appropriate rate. The information from the detection device detailing the fit up is fed back to an imaging system component and a parameter determination component that allows for the determination component to determine whether adjustments to any one of the aforementioned weld parameters should be made. The result of a change in operating parameters is that the welding torch is able to alter the amount of material used to fill in the gap.

DRAWINGS

These and other features, aspects, and advantages of the present invention will become better understood when the following detailed description is read with reference to the accompanying drawings in which like characters represent like parts throughout the drawings, wherein:

FIG. 1 is a diagrammatical representation of an exemplary welding system utilizing aspects of the present techniques;

FIG. 2 is a detailed view of an end portion of a metal cored electrode for use with the system of FIG. 1;

FIG. 3 is a diagrammatical view representing movement of the metal cored electrode in accordance with aspects of the present techniques;

FIG. 4 is a diagrammatical representation of a progressing weld bead utilizing a circular pattern for movement of a metal cored welding wire;

FIG. 5 is a similar illustration of a progressing weld bead utilizing a an elliptical path for a metal cored welding wire;

FIG. 6 is a further illustration of a progressing weld bead utilizing a differently oriented elliptical path for a metal cored welding wire;

FIG. 7 is a illustration of an exemplary arc location and transfer mode for a progressing weld bead utilizing a moving metal cored welding wire electrode;

FIG. 8 is a timing diagram illustrating movement of a metal cored welding electrode together with an exemplary forced transfer trace;

DETAILED DESCRIPTION

Figure 9:
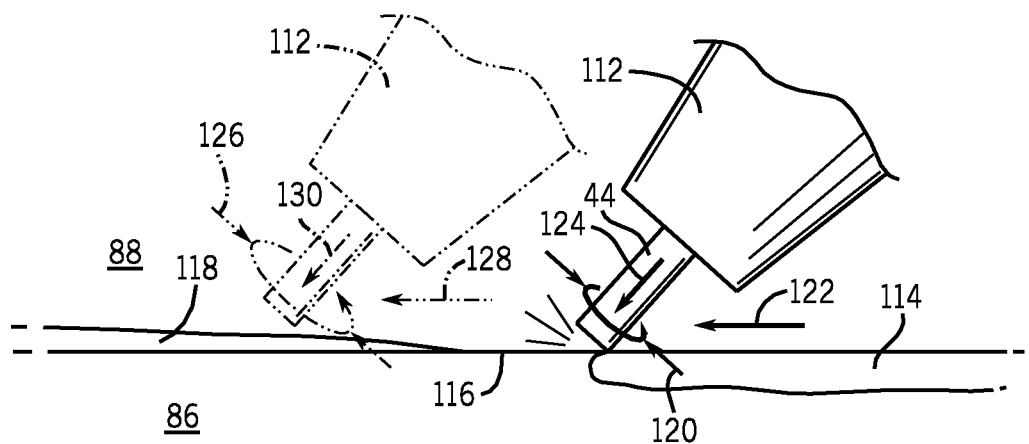
FIG. 9 is an illustration of a progressing welding torch nozzle and weld bead with initial weld parameters and a phantom view of the same welding torch nozzle as it encounters a gap along the weld path with newly adjusted weld parameters.

FIG. 1 illustrates an exemplary welding system 10 utilizing movement of a metal cored welding wire electrode though as discussed earlier these techniques could be used with many types of wires, such as solid wire or flux cored wire. The system 10 is designed to produce a weld 12 on a workpiece 14. The weld may be oriented in any desired manner, including butt weld, lap weld, angled welds, out-of-position welds, and so forth. The system includes a power supply 16 that will typically be coupled to a gas source 18 and to a power source 20, such as the power grid. Other power sources, of course, include generators, engine-driven power packs, and so forth. A wire feeder 22 is coupled to the power source 20 and supplies metal cored welding wire to a welding gun 24.

In the illustrated embodiment, the power supply 16 will include power conversion circuitry 26 coupled to control circuitry 28 that regulates operation of the power conversion circuitry to produce power output suitable for the welding operation. The power supply may be designed and programmed to produce output power in accordance with a number of processes, welding regimes, and so forth, including constant current processes, constant voltage processes, pulsed processes, short circuit transfer processes, and so forth. In a presently contemplated embodiment, the control circuitry 28 controls the power conversion 26 to produce a DCEN (sometimes referred to as a "straight" polarity) welding regime that aids in the transfer of material from the metal cored welding wire to a progressing weld bead. However, other welding regimes may of course be used. An operator interface 30 allows a welding operator to alter both the welding process and the process settings. Moreover, in certain contemplated embodiments the operator interface may allow selection modification of certain parameters related to movement of the welding gun and the metal cored welding wire. Finally, the power supply may include valving 32 for regulating the flow of shielding gas from the gas source 18.

The wire feeder 22 will typically include control circuitry, illustrated generally by reference numeral 34, which regulates the feed of welding wire from a spool 36. The welding wire is advanced by a drive assembly 38, typically through the use of a small electric motor under the control of the control circuitry 34. Welding wire, gas, and control and feedback data may be exchanged between the wire feeder 22 and the welding gun 24 via a weld cable 40. The workpiece 14 is also coupled to the power supply by a work cable 42 to complete an electrical circuit through the electrode 44 when an electric arc is established between the electrode and the workpiece. As described more fully below, the electrode 44 advancing from the welding gun is forced to move, such as in a rotary motion as indicated by reference numeral 46.

The welding system illustrated in FIG. 1 may be designed for manual operation, although many of the applications for the present techniques will be automated. That is, the welding gun 24 will be secured to a robot which is programmed to position the welding torch at desired locations with respect to a workpiece. The robot may then act to initiate arcs between the electrode and the workpiece, and properly orient the welding gun and advance the welding gun along a predefined path where a weld bead is to be established to join two components. As described more fully below, in such automation applications, the present techniques allow for greatly enhanced travel speeds and improved weld bead characteristics.

The present techniques are designed for use with solid wire, flux cored or metal cored welding wires although in the present embodiment, a metal cored wire of the type illustrated in FIG. 2 is shown. Such welding wires generally comprise a sheath 46 made of metal wrapped around one or more metal cores 50. Various techniques are known for producing such metal cored welding wires, and are beyond the scope of the present invention. The characteristics of the metal cored welding wire may be selected for a particular application, particularly depending upon the metallurgy of the components to be joined, the type of shielding gas to be used, the anticipated fill volumes of the weld bead, and so forth. The same holds true for both solid wires and flux cored wires if either of these two are chosen in place of metal cored wires, as discussed earlier. In the illustrated embodiment, certain geometries of the metal cored welding wire may assist in enhancing the benefits of the electrode movement. For example, the welding wire will typically be selected to have a desired diameter 52. The diameter comprises a sheath wall thickness 54 and a core diameter 56. These parameters may be altered and optimized to enhance the performance of the welding wire and to provide such characteristics as improved arch establishment, arc maintenance, material transfer, metallurgy of the resulting weld bead, weld bead penetration, and so forth.

In a presently contemplated embodiment, specific wires may be selected for use with DCEN welding regimes. As discussed more fully below, for example, it has been found that the combination of "spin-arc" movement with DCEN processes and wires such as wires comprising stabilizers, and other components, such as manganese (e.g., AWS E5.18 70C-6; and more generally, E5.18 XXC-6, where "XX" denotes tensile strength) provide excellent results. One such wire is commercially available under the name Metalloy® X-Cel™ from Hobart Brothers of Troy, Ohio. Still further, certain formulations of welding wire are believed to provide benefits beyond those obtainable with other wires. Such formulations are described in U.S. Pat. No. 6,723,954, entitled Straight Polarity Metal Cored Wire, issued to Nikodym et al. on Apr. 20, 2004; U.S. Pat. No. 7,087,860, entitled Straight Polarity Metal Cored Wire, issued to Nikodym et al. on Aug. 8, 2006; and U.S. Pat. No. 7,863, 538, entitled Metal-Core Gas Metal Arc Welding of Ferrous Steels with Noble Gas Shielding, issued to Barhorst et al. on Jan. 4, 2011, which are all hereby incorporated into the present disclosure by reference. Moreover, certain composition modifications may be made so such wires to enhance their performance in DCEN processes with forced movement of the arc, as discussed below.

FIG. 3 illustrates movement of the welding wire in a typical application. As shown in FIG. 3 a joint 58 is to be formed between workpieces, and the welding torch with the electrode 44 extending from it is positioned in close vicinity to the intended joint. An arc is then established between the electrode and the underlying metal to be joined. The electrode emanates from a contact element 60 which can be moved to force motion of the electrode and the established arc. For movement of the contact element, a motion control assembly 62 is provided in the welding gun. Although numerous techniques may be utilized for forcing such motions, in a presently contemplated arrangement, a cam 64 is turned by a motor 66 which itself is controlled and powered by the control circuitry of the system. The contact element and electrode are thus forced to move in a predefined pattern and at a predefined frequency as determined by the geometry and control of the motion control assembly 62. As illustrated in FIG. 3, the tip of the contact element, and thus the electrode may be moved a predetermined distance or radius 68 from the center line of the contact element. As described below, various patterns may be utilized for this motion. The electrode 44 is advanced during this process to form the desired weld bead. Moreover, the entire assembly is moved at a desired travel speed as indicated by reference numeral 70.

FIG. 4 illustrates an exemplary progressing weld bead 72 along with certain patterns of motion of the electrode 44. As will be appreciated by those skilled in the art, the weld bead progresses behind a weld pool or puddle 74 comprised of molt and metal resulting from heating of the electrode and surrounding metal of the base materials of the workpiece. The electrode in the illustration of FIG. 4 is moved in a generally circular pattern as indicated by reference numeral 76. It is presently contemplated that such motion may be coordinated with the travel speed of the welding gun such that the electrode will be sufficiently close to the weld puddle 74 and peripheral regions of the workpiece to maintain the arc and to move the arc between these regions, maintaining the weld puddle while heating the electrode and surrounding metal. As described below, it is also contemplated that other coordinating factors may be employed, such as wire feed speeds, rates or frequencies of movement of the electrode, pulse frequencies or DC parameters for the welding process (e.g., currents and voltages applied to create the arc) and so forth.

FIG. 5 illustrates a further possible pattern for movement of the electrode, in this case a generally elliptical pattern 78. The ellipse in this case has a major axis 80 along the direction of travel of the weld and torch and a minor axis 82 transverse to the direction of travel. Moreover, FIG. 6 illustrates a further possible pattern, namely a transverse elliptical pattern 84 in which a major axis 80 of the elliptical movement is transverse to the direction of travel of the weld and torch. It should be noted, however, any desired pattern may be utilized, and the motion control assembly may be adapted to implement these patterns, among others. For example, patterns defining zigzags, figure 8's, transverse reciprocating lines, and so forth may be used and optimized for particular welds.

FIG. 7 shows an exemplary deposition and penetration scheme believed to operate when a metal cored welding wire is utilized with forced motion. That is, the electrode 44 is moved between workpieces 86 and 88 to be joined. A weld bead 90 forms that penetrates into the workpieces and creates a generally flat surface as the weld bead advances. In the illustration of FIG. 7, reference numeral 94 refers to a maximum approach of the sheath 48 of the welding wire toward workpiece 86, while reference numeral 94 represents a maximum approach of the sheath 48 to the workpiece 88.

In the present embodiment it is believed that the arc established between the metal cored welding wire and the workpieces and/or the progressing weld puddle exists only between the sheath 48 and these elements. Accordingly, unique transfer locations are established as indicated by reference numeral 98. It has been observed that resulting welds are flatter than similar welds that may be established by electrode motion using solid wire electrodes. Moreover, it is believed that enhanced penetration into the base materials is obtained as indicated by reference numeral 100. However, this should not be seen as a limitation to any particular types of wire that can be used. As discussed earlier, the present techniques can also be used with solid wire and flux cored wire in addition to metal cored wire.

Parameters that may be varied in the technique may include factors such as the rate of movement of the electrode, and the degree of movement of the electrode about a normal or central position. In particular, while the invention is certainly not limited to a circular pattern, where circular patterns have been used, it is believed that rates of rotation higher than 50 Hz, and extending to 100-120 Hz and higher may be desirable, obtaining flatter weld beads and higher deposition rates. Moreover, diameters of rotation are presently contemplated on the order of 1.5 mm, but higher diameters, such as on the order of 1.2 mm may be desired. It may also be desirable to provide electrode movement that is synchronized or coordinated with gas flow. These various parameters may assist in the penetration into the base materials, the deposition of the electrode material, the maintenance of the arc, as well as other welding parameters.

It is also believed that the weld puddle may move better with movement of the metal cored electrode, possibly due to mechanical forces (e.g., centrifugal forces) imparted on the molten ball or spray that develops at the electrode tip. The process may thus be able to run cooler than previous processes. Enhanced benefits may be offered as well on certain types of workpieces and workpiece metallurgies, particularly galvanized workpieces. Furthermore, the process may allow for less expensive shielding gasses, such as $CO_2$ rather than Argon mixes are currently used with such welding electrodes. As discussed earlier, sold wires and flux cored wires may be used with the present techniques as well and may each bring their own advantages to the process.

FIG. 8 illustrates an exemplary timing diagram relating movement of the metal cored welding electrode with forced transfer of material from the electrode tip. In diagram of FIG. 8, electrode tip movement is indicated by trace 102 over time, while forced transfer is indicated by trace 104. In a circular movement pattern, a generally sinusoidal motion will be expected from the point of view of any particular point in the advancing weld bead or, the puddle, or any particular location of the joint. At points 106 in this motion, the sheath of the electrode may most closely approach the sides of the base materials of the workpiece. The welding process may be adapted, such as by control of pulsed welding regimes, to force or enhance transfer of material from the electrode at these locations, as indicated generally by reference numeral 108. These times will typically occur periodically as indicated by times 110. These and many other control regimes may be envisaged as described above for coordinating transfer modes with motion of the metal cored welding electrode, particularly making use of the establishment of the arc with the sheath of the electrode only. As discussed earlier, this should be seen as an illustrative example, as the present techniques can be used with solid wires as well as flux cored wires, in addition to metal cored wires.

In addition to the foregoing examples, it has been found that the use of DCEN welding procedures with the metal cored wired discussed above, with mechanical movement of the arc, may provide particularly good results, and may be even more attractive on certain types of workpieces (or baseplate materials). For example, the Metalloy® X-Cel™ wire mentioned above is particularly well suited to reduce spatter, while enhancing weld metal wetting (avoiding overly "crowned" beads). The use of a DCEN process, moreover, with arc movement and in combination with such wires, reduces overheating. The combination may be particularly useful for galvanized sheet material welding (e.g., in automotive applications), for coated or painted material welding, for thin steel welding (e.g., in furniture manufacturing), and so forth.

It is currently believed that welding wires suitable for these applications (corresponding generally to the X-Cel™ wire mentioned) are characterized by components that stabilize the arc (producing stable arcs with reduced spatter). For example, such stabilizers may include potassium and compounds that contribute potassium during the welding process (such as potassium feldspar, potassium titanate, potassium manganite-titanate, potassium sulfate, potassium carbonate, potassium phosphate, potassium molybdate, potassium nitrate, potassium fluosilicate, and complex oxide compounds containing potassium). Moreover, graphitic and non-graphitic carbon sources may provide stabilization by sublimating into the arc column and by rendering finer droplet metal transfer. Possible modification of existing welding wires (such as those mentioned) could include potassium from any other or more sources noted above, and a suitable carbon source, such as graphite or carbon containing iron and/or alloy powders.

Regarding the particular DCEN processes involved, these will typically be performed at currents and voltages selected based at least in part on the electrode diameter, the electrode extension (e.g., contact tip to plate), the welding position, the workpiece or base plate type and diameter, the travel speed and deposition rates, the wire feed speed, and so forth. For example, voltages ranging from 21 to 30 Volts may be suitable, with currents ranging from 150 to 450 Amps. Moreover, regarding shielding gases, appropriate gas mixes are believed to include argon and carbon dioxide, with a minimum of 75% and a maximum of 95% argon (although other amounts and combinations may be satisfactory, such as 98% argon, 2% oxygen). Still further, it is contemplated that the DCEN polarity selected may include non-pulsed and pulsed current.

In a presently contemplated embodiment, various parameters of a welding system of the type described above may be altered during welding to accommodate various fit-up issues that are detected. For example, as illustrated in FIG. 9, as welding progresses, the welding torch nozzle 112 and electrode leave behind an advancing weld bead 114 while traveling along a predetermined weld line 116. As illustrated, the line of the weld will encounter a gap or fit-up problem, as indicated generally by reference numeral 118. The weld line is developed as a result of an initial spin geometry 120, travel speed 122 and wire feed speed 124. Any suitable parameters may be utilized, depending upon such factors as the materials of the workpiece, the type and size of wire electrode, and so forth. In general, it should also be noted that the "spin geometry" may comprise various factors, including the diameter or radius of movement of the electrode tip, the pattern of movement, and so forth. These initial parameters taken together create a weld bead of a width and penetration adequate to avoid defects in the finished welded piece. These initial parameters may then be varied in a number of ways to compensate for problems in fit-up, such as gaps encountered between the workpieces. Because the fit-up may vary along the weld path, the weld parameters may need to be adjusted into a new combination adequate to avoid defects in the weld. As shown in the phantom view of FIG. 9, these new parameters may include second spin geometry 126 (e.g., a different diameter or radius of movement of the electrode tip), second travel speed 128 and second wire feed speed 130, adjusted as the weld torch approaches the fit-up, are directly related to the measurement constraints posed by the gap (fit-up parameter) 118.

Figure 10:
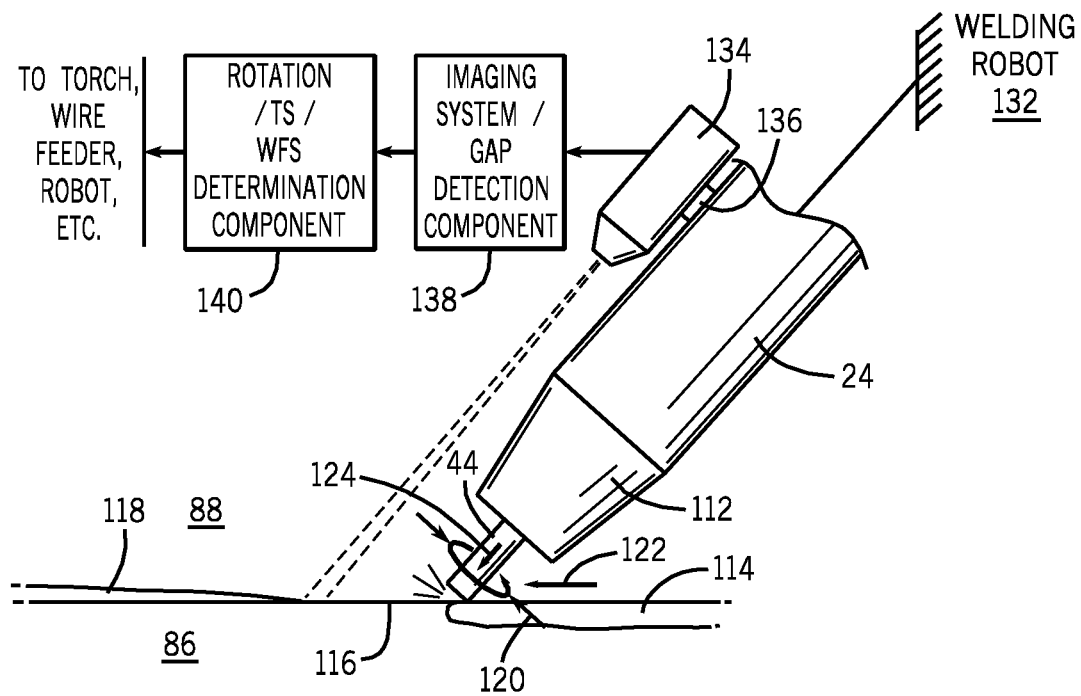
FIG. 10 is an illustration of the camera/detection device detecting fit-up along the weld path and delivering that information to the imaging and parameter calculation components in order to adjust welding parameters.

As illustrated in FIG. 10, in an exemplary application, a welding robot 132 moves the welding torch 24 along the weld line. A camera/detection device 134 that is responsible for monitoring any changes in the fit-up along the weld path is attached to the torch via a mechanical mount 136, allowing the detection device to move along with the torch. The device is positioned in such a way as to allow it to examine the fit-up between workpieces 86 and 88 just ahead of the torch. This information, which may be in the form of a pixelated image, allows the imaging system/gap detection component 138 to note the parameter changes between the weld line and the gap 118. This may be done, for example, by detecting spaces or pixels indicative of a developing gap (or conversely, of more closely fitting pieces). This information is then transmitted to a parameter calculation component 140 which determines which, if any, of the initial weld parameters need to be adjusted in order to properly fill in the gap with a sufficient amount of material. The determination of appropriate parameter adjustments may be performed by appropriate calculations, look-up tables, or any other desired algorithm. Such tables may, for example, call out various fit-up or gap parameters (e.g., size or distance), and relate these to the wire feed, travel speed, power, electrode spin, and so forth appropriate for the particular fit-up. For example, this component may determine that the new spin geometry necessary for the gap should to be larger or smaller, or of a different shape, which require changing the manner in which the electrode is moved. Furthermore it may be determined that the travel speed may remain the same as before and/or that the wire feed speed should increase/decrease. At the same time, it may be determined that the charge to the electrode should be adjusted as well. At this point, these parameters are adjusted according to the determination and the weld torch continues its advance towards the gap. It should be noted that when parameters are to be adjusted to accommodate changes in fit-up, these are generally controlled by the appropriate system component involved. For example, changes in weld power are adjusted by the power source or supply. Changes in wire feed speed are made by the wire feeder. Changes in travel speed, in automated applications, are adjusted by the robot that moves the welding torch. Changes in spin geometry are implemented by the mechanism within the welding torch that moves the welding electrode. Those skilled in the art will readily appreciate that these devices may be designed to implement the altered parameters during the welding operation.

Figure 11:
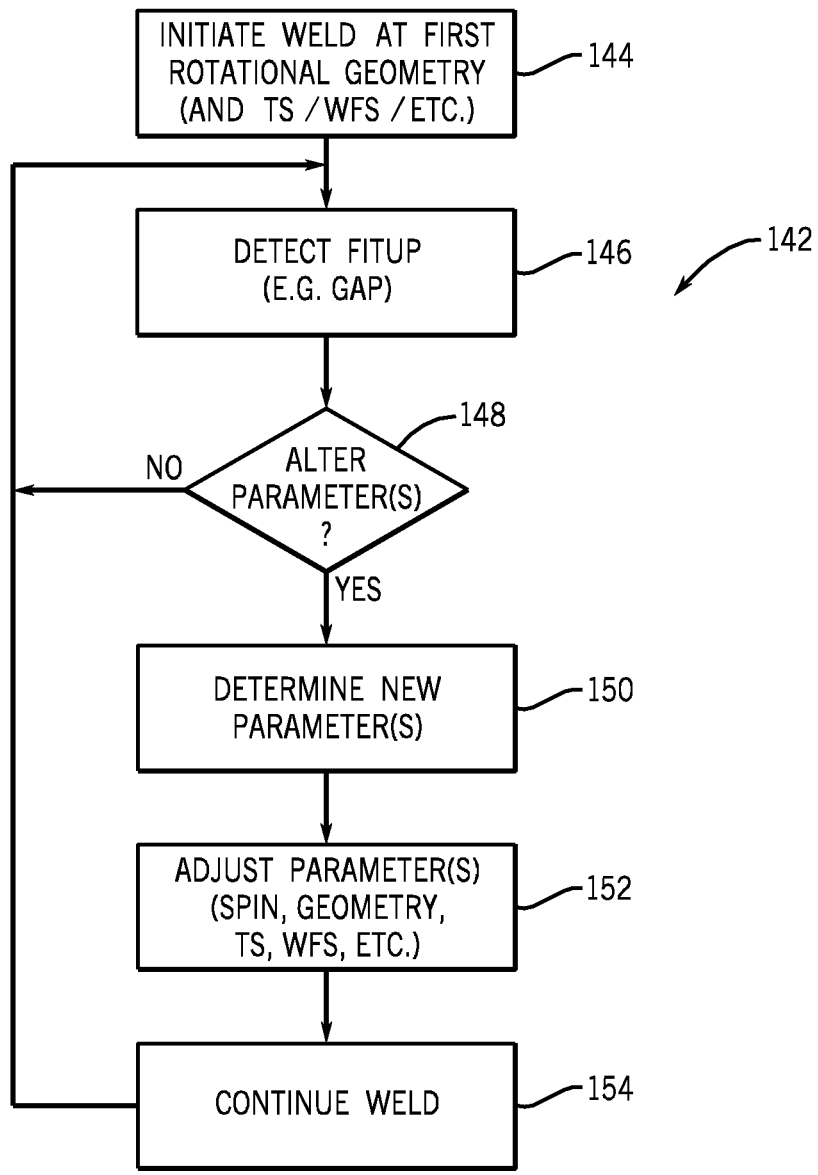
FIG. 11 is a method flow diagram illustrating exemplary logic employed to determine whether and how to adjust one or several of the weld's parameters.

The ability to detect gaps and change weld parameters as necessary is summarized in FIG. 11, which is a method flow diagram showing exemplary control logic 142 employed by the system components to address fit-up changes, such as gaps between the workpieces. As the welding torch and electrode approach a gap, they do so with their initial rotational geometry, travel speed, wire feed speed and weld power applied to the electrode, as indicated at step 144. The detection device then detects and measures the fit-up via imaging, as indicated at step 146, with the associated information being used to determine whether the parameters should be changed, as indicated at step 148. If the path of the weld line does not warrant a variation to the initial parameters the weld torch continues to operate and advance along the weld line with the same geometry, travel speed, wire feed speed and weld power applied to the electrode. In this case the detection device simply continues to detect fit-up, returning to step 146. In the event the control determines that the initial parameters should be changed, the control logic advances to either calculating those changes or obtaining the figures via a lookup table, as indicated at step 150. Here, one or any combination of parameters, such as spin geometry, torch travel speed, feed speed of the wire and weld power may be adjusted in order to adequately weld the workpieces together across the gap. After making the determination, the appropriate parameters are adjusted, as indicated at step 152, in accordance with the calculations/look-up table and the weld torch continues welding, as indicated at step 154. After welding over the gap, or more generally after implementing the new parameters, the control logic returns to step 144 where it continues the process of monitoring fit-up (step 146) and determining whether weld parameters should be altered (step 148). It should be noted that if fit-up improves during welding, such as following closure of a gap, the same logic may allow for similar alteration of the welding system parameters to reflect the improved fit-up.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A welding method comprising:
   establishing an arc between a welding electrode and a workpiece;
   feeding the welding electrode from a welding torch while cyclically moving the welding electrode in a desired pattern by a motion control assembly within the welding torch, wherein the motion control assembly cyclically moves the welding electrode at a rate of at least 50 hertz, and the desired pattern comprises a noncircular pattern with respect to a central position of the welding electrode of the welding torch;
   advancing the welding torch or the workpiece to establish a weld bead; and
   altering a geometry of the desired pattern while maintaining the arc and weld bead.

2. The welding method of claim 1, wherein altering the geometry of the desired pattern comprises altering a major axis of a generally elliptical pattern.

3. The welding method of claim 1, comprising also altering a wire feed speed of the welding electrode.

4. The welding method of claim 1, comprising also altering a travel speed of the welding torch.

5. The welding method of claim 1, comprising also altering a parameter of weld power applied to the welding electrode.

6. The welding method of claim 1, comprising detecting a fit-up parameter of the workpiece, and wherein the geometry of the desired pattern is altered based upon the detected fit-up parameter.

7. The welding method of claim 6, wherein the fit-up parameter is detected by a detector mounted to the welding torch.

8. The welding method of claim 1, wherein the welding torch is mounted to a welding robot.

9. A welding method comprising:
   establishing an arc between a welding electrode and a workpiece;
   feeding the welding electrode from a welding torch while cyclically moving the welding electrode in a desired pattern by a motion control assembly within the welding torch, wherein the motion control assembly cyclically moves the welding electrode at a rate of at least 50 hertz, and the desired pattern comprises a noncircular pattern with respect to a central position of the welding electrode of the welding torch;
   advancing the welding torch or the workpiece to establish a weld bead;
   detecting a fit-up parameter of the workpiece; and
   altering a geometry of the desired pattern based upon the detected fit-up parameter while maintaining the arc and weld bead.

10. The welding method of claim 9, wherein altering the geometry of the desired pattern comprises altering a major axis of a generally elliptical pattern.

11. The welding method of claim 9, comprising also altering a wire feed speed of the welding electrode based upon the detected fit-up parameter.

12. The welding method of claim 9, comprising also altering a travel speed of the welding torch based upon the detected fit-up parameter.

13. The welding method of claim 9, comprising also altering a parameter of weld power applied to the welding electrode based upon the detected fit-up parameter.

14. A welding method comprising:
   establishing an arc between a welding electrode and a workpiece;
   feeding the electrode from a welding torch while cyclically moving the welding electrode in a noncircular desired pattern by a motion control assembly within the welding torch, wherein the motion control assembly cyclically moves the welding electrode at a rate of at least 50 hertz;
   advancing the welding torch or the workpiece to establish a weld bead; and
   altering at least one of a geometry of the noncircular desired pattern, a welding torch travel speed, an electrode wire feed speed, a parameter of welding power applied to the welding electrode, and a rate of cyclic movement of the welding electrode while maintaining the arc and weld bead.

15. The welding method of claim 14, comprising detecting a fit-up parameter of the workpiece, and wherein the alteration is based upon the detected fit-up parameter.

16. The welding method of claim 15, wherein the fit-up parameter is detected by a detector mounted to the welding torch.

17. A welding system comprising:
a power supply configured to generate welding power;
a welding torch configured to receive the welding power;
a wire feeder configured to feed welding wire to the welding torch;
a welding wire rotation assembly associated with the welding torch and configured to move the welding wire in a non-circular pattern with respect to a central position of the welding wire of the welding torch as the welding wire is advanced towards a work piece and as an arc is maintained by the welding power, wherein the welding wire rotation assembly cyclically moves the welding wire at a rate of at least 50 hertz;
a fit-up parameter detection component configured to detect a fit-up parameter of a workpiece; and
control circuitry configured to alter movement of the welding wire based upon the fit-up parameter.

18. The welding system of claim 17, wherein movement of the welding torch is controlled by a welding robot on which the welding torch is mounted.

19. The welding system of claim 17, wherein the fit-up parameter detection component is mounted to the welding torch.

20. The welding system of claim 17, wherein the control circuitry comprises circuitry of at least one of the power supply and the wire feeder.

* * * * *